United States Patent
Komori

(10) Patent No.: US 10,711,685 B2
(45) Date of Patent: Jul. 14, 2020

(54) INTERNAL COMBUSTION ENGINE

(71) Applicant: TOYOTA JIDOSHA KABUSHIKI KAISHA, Toyota-shi, Aichi-ken (JP)

(72) Inventor: Satoshi Komori, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 21 days.

(21) Appl. No.: 16/232,199

(22) Filed: Dec. 26, 2018

(65) Prior Publication Data

US 2019/0203634 A1 Jul. 4, 2019

(30) Foreign Application Priority Data

Dec. 27, 2017 (JP) .................... 2017-251137

(51) Int. Cl.
| | |
|---|---|
| F02B 23/06 | (2006.01) |
| F02F 3/26 | (2006.01) |
| F02F 3/28 | (2006.01) |
| F02B 23/08 | (2006.01) |
| F02M 31/00 | (2006.01) |
| F02F 3/24 | (2006.01) |
| F02B 31/00 | (2006.01) |

(52) U.S. Cl.
CPC ...... *F02B 23/0621* (2013.01); *F02B 23/0678* (2013.01); *F02B 23/08* (2013.01); *F02B 31/00* (2013.01); *F02F 3/24* (2013.01); *F02F 3/26* (2013.01); *F02F 3/28* (2013.01); *F02M 31/00* (2013.01); *F02B 2031/006* (2013.01)

(58) Field of Classification Search
CPC .. F02B 23/06; F02B 23/0621; F02B 23/0678; F02M 23/06; F02M 23/0624; F02M 23/108; F02M 31/00; F02M 35/10059; F02D 2041/0015; F02F 3/24; F02F 3/26; F02F 3/28
USPC ............................. 123/18 R, 251, 289, 290
See application file for complete search history.

(56) References Cited

U.S. PATENT DOCUMENTS

| | | | | |
|---|---|---|---|---|
| 7,856,958 | B2 * | 12/2010 | Tachibana | ............ F02B 23/08 |
| | | | | 123/307 |
| 2002/0170531 | A1 * | 11/2002 | Saito | .................. F02B 17/005 |
| | | | | 123/295 |

(Continued)

FOREIGN PATENT DOCUMENTS

| | | |
|---|---|---|
| JP | 2013-083193 | 5/2013 |
| JP | 2014-122589 A | 7/2014 |
| JP | 2016-098791 A | 5/2016 |

*Primary Examiner* — John Kwon
*Assistant Examiner* — Johnny H Hoang
(74) *Attorney, Agent, or Firm* — Finnegan, Henderson, Farabow, Garrett & Dunner, LLP

(57) ABSTRACT

When an amount of a backward tumble flow is smaller than an amount of a forward tumble flow, the intake-side valve recess is used as a first valve recess and the exhaust-side valve recess is used as a second valve recess. When the amount of the backward tumble flow is larger than the amount of the forward tumble flow, the exhaust-side valve recess is used as a first valve recess and the intake-side valve recess is used as a second valve recess. An inclination angle of the first valve recess is larger than an inclination angle of the second valve recess when comparing the inclination angle such that a height of the recess decreases gradually toward an inner side of a cross-section.

3 Claims, 7 Drawing Sheets

(56) References Cited

U.S. PATENT DOCUMENTS

2008/0276900 A1* 11/2008 Umierski ............... F02B 23/08
                                                    123/193.6
2016/0186687 A1    6/2016 Minooka

* cited by examiner

INTERNAL COMBUSTION ENGINE

This application claims the benefit of Japanese Patent Application No. 2017-251137, filed on Dec. 27, 2017, which is hereby incorporated by reference herein in its entirety.

BACKGROUND

Technical Field

The present disclosure relates to an internal combustion engine that generates swirl and tumble flows in a combustion chamber.

Description of the Related Art

Conventionally, in an internal combustion engine in which an air-fuel mixture gas is burnt in a combustion chamber to generate power, a swirl flow (a vortex flow in a circumferential direction of a cylinder) generated in the combustion chamber is effectively used so as to enhance fuel combustion efficiency, improve output power, reduce exhaust emission, and decrease fuel consumption, for example. That is, vaporization and atomization of fuel is accelerated by stirring in the combustion chamber by this swirl flow so that the fuel in the combustion chamber is burnt satisfactorily.

Various structures have been proposed as means for positively generating a swirl flow. For example, an internal combustion engine which includes two intake ports including a tangential port and a helical port and in which a swirl flow is generated in a combustion chamber by the tangential port is known (see Patent Literature 1).

Patent Literature 1: Japanese Patent Application Publication No. 2013-083193

SUMMARY

In Patent Literature 1, due to intake air flowing into the combustion chamber from the intake port (particularly, the tangential port), a forward tumble flow which is a tumble flow flowing along an upper surface in the combustion chamber from the intake port toward an exhaust port and a backward tumble flow which is a tumble flow flowing along a lower surface in the combustion chamber from the intake port toward the exhaust port are generated. Due to these forward and backward tumble flows, the central axis of the swirl flow is inclined with respect to the central axis of the cylinder and an air-fuel mixture ratio decreases. As a result, emission such as occurrence of smoke may increase.

With the foregoing in view, an object of the present disclosure is to suppress the effects of tumble flow on swirl flow to reduce emission.

A first disclosure provides an internal combustion engine may including: a mechanism configured to generate a swirl in a combustion chamber; and a piston having an intake-side valve recess, which is a recessed surface formed to avoid interference with an intake valve and an exhaust-side valve recess, which is a recessed surface formed to avoid interference with an exhaust valve, wherein when an amount of a backward tumble flow, which is a tumble flow flowing along a lower surface in the combustion chamber from the intake port toward the exhaust port is smaller than an amount of a forward tumble flow, which is a tumble flow flowing along an upper surface in the combustion chamber from the intake port toward the exhaust port, the intake-side valve recess is used as a first valve recess and the exhaust-side valve recess is used as a second valve recess, when the amount of the backward tumble flow is larger than the amount of the forward tumble flow, the exhaust-side valve recess is used as a first valve recess and the intake-side valve recess is used as a second valve recess, and when the piston is cut along a cross-section parallel to a central axis of the piston passing through the first valve recess and the second valve recess adjacent thereto, an inclination angle of the first valve recess may be larger than an inclination angle of the second valve recess when comparing the inclination angle such that a height of the recess decreases gradually toward an inner side of the cross-section.

A second disclosure is the internal combustion engine according to the first disclosure, may further including two intake ports, which are a tangential port and a helical port, wherein the tangential port and the helical port may be shaped such that the amount of the backward tumble flow is smaller than the amount of the forward tumble flow, and a valve recess corresponding to the tangential port may be inclined further toward the center of the cross-section than a valve recess corresponding to the helical port.

A third disclosure is the internal combustion engine according to the first or second disclosure, in which at least one of the valve recesses close to the intake port may be provided in parallel to at least one of the valve recesses close to the exhaust port.

According to the first disclosure, since a forward tumble flow and a backward tumble flow can be weakened each other, the effects on a swirl flow, of a tumble flow can be suppressed and emission can be reduced.

According to the second disclosure, in an internal combustion engine including a tangential port and a helical port, since the amount of a tumble flow generated by the tangential port is larger than the a tumble flow generated by the helical port, the effects on a swirl flow of the tumble flow can be suppressed further, and emission can be reduced.

According to the third disclosure, since the step of adjusting individual inclinations of jigs or the like for cutting during manufacturing, the manufacturing can be made easily.

DESCRIPTION OF THE EMBODIMENTS

Hereinafter, specific embodiments to which the present disclosure is applied will be described in detail with reference to the drawings. However, the present disclosure is not limited to the following embodiments. In order to clarify the explanation, the following description and the drawings are simplified as appropriate.

Embodiment 1

Figure 1:
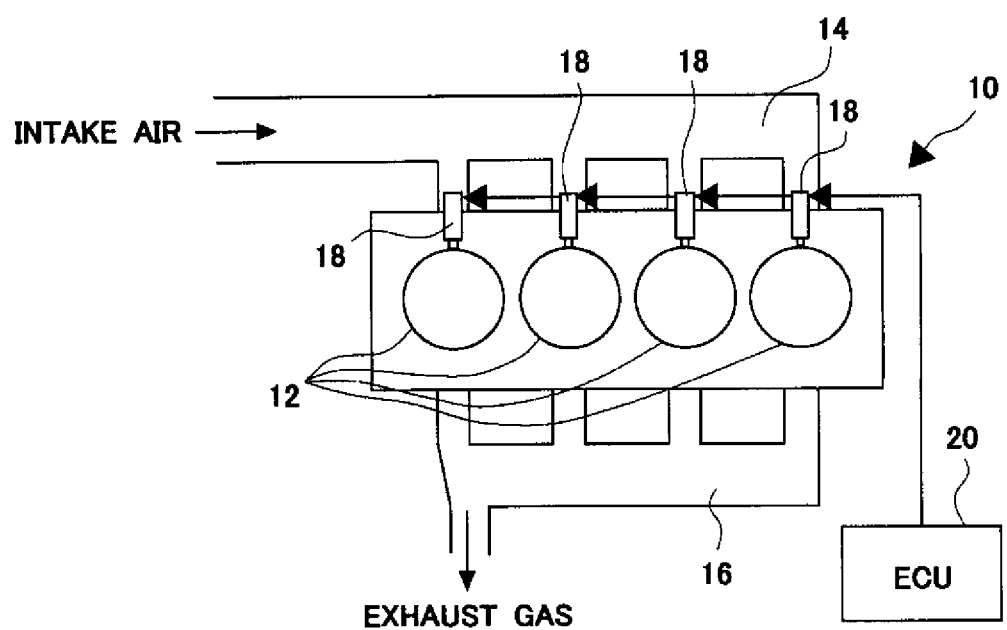
FIG. 1 illustrates an entire structure of an internal combustion engine.

FIG. 1 is a diagram schematically illustrating an entire structure of an internal combustion engine 10 according to Embodiment 1 of the present disclosure. The internal combustion engine 10 is a compression ignition-type engine (for example, a diesel engine) in which fuel is injected from a fuel injection valve 18 positioned in each cylinder near a compression top dead center and is burnt by compression ignition. An intake passage 14 and an exhaust passage 16 communicate with a combustion chamber 12 of each cylinder of the internal combustion engine 10.

An actuator for controlling the internal combustion engine 10 such as the fuel injection valve 18 is electrically connected to an electronic control unit (ECU) 20 and is driven according to an instruction from the ECU 20.

Figure 2:
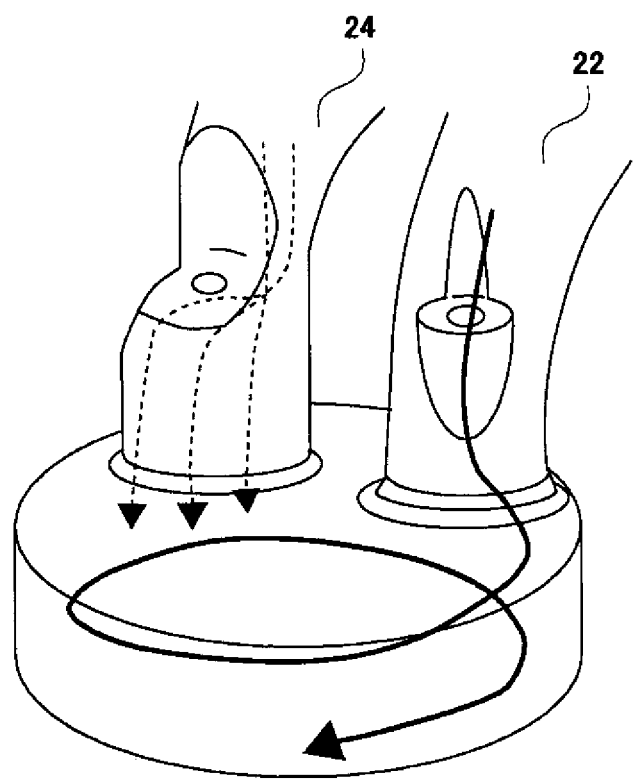
FIG. 2 illustrates a specific structure of an intake port.

FIG. 2 is a perspective view for describing a specific structure of an intake port included in the intake passage 14 illustrated in FIG. 1. As illustrated in FIG. 2, the intake passage 14 includes a tangential port 22 and a helical port 24 as an intake port connected to the same combustion chamber 12.

The tangential port 22 is formed so as to be able to guide intake air so that the intake air flows into the combustion chamber 12 in a direction along a cylinder inner circumferential surface 26. According to the tangential port 22 formed in this manner, the larger the amount of intake air supplied from the tangential port 22, the stronger becomes the swirl flow generated in the combustion chamber 12. Moreover, the tangential port 22 generates a tumble flow simultaneously with the swirl flow.

The tangential port 22 is mainly responsible for generation of a swirl flow in the internal combustion engine 10, and the helical port 24 is configured to supply an intake air of a spiral form in the same rotation direction as the generated swirl flow into the combustion chamber 12.

The exhaust passage 16 includes two exhaust ports connected to the same combustion chamber 12.

Next, a structure of a top surface of the piston will be described with reference to FIGS. 3 and 4.

Figure 3:
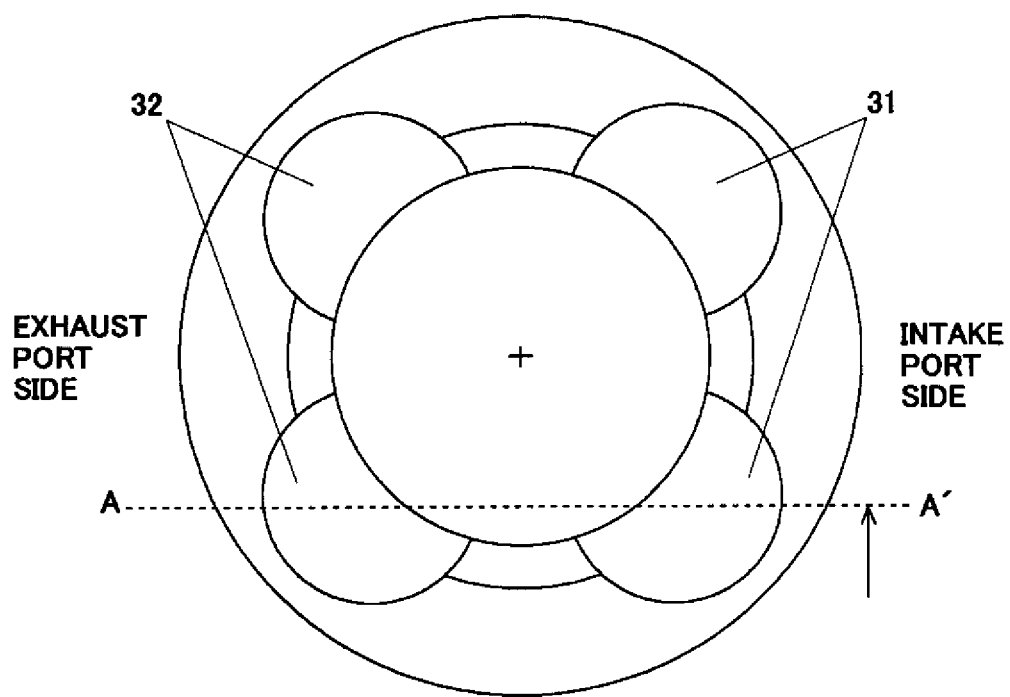
FIG. 3 is a top view of a piston according to Embodiment 1.

FIG. 3 is a view when the piston is seen from an upper side in an axial direction of the cylinder. Two intake-side valve recesses 31 for avoiding interference with two intake valves and two exhaust-side valve recesses 32 for avoiding interference with two exhaust valves are formed in the top surface of the piston.

Figure 4:
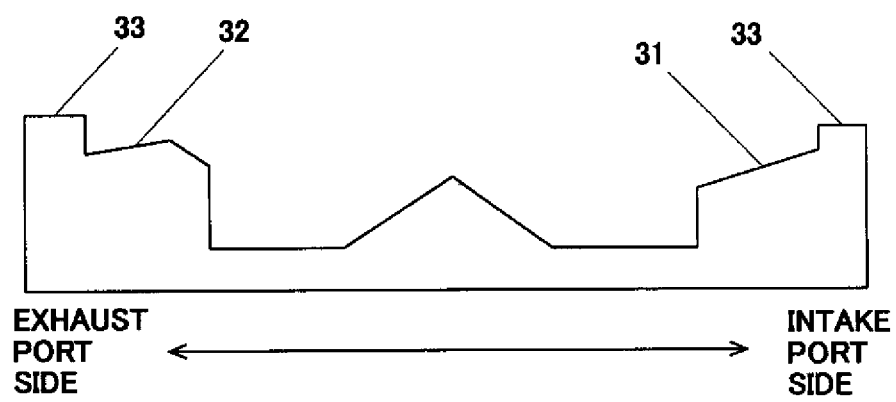
FIG. 4 is a cross-sectional view of the piston according to Embodiment 1.

FIG. 4 is a view when the piston is cut along a cross-section (A-A' cross-section in FIG. 3) parallel to a central axis of the piston passing through the intake-side valve recess 31 and the exhaust-side valve recess 32 adjacent thereto. A cavity which is a recess is formed in the top surface of the piston of the present embodiment, and a squish is provided on an outer periphery thereof.

Valve recesses of a piston of a conventional internal combustion engine are provided to be inclined toward the outer side of the piston so as to comply with the inclinations of respective intake valves or respective exhaust valves.

On the other hand, the intake-side valve recess 31 of the present embodiment is provided to be inclined toward the center of the A-A' cross-section. The exhaust-side valve recess 32 is provided to be inclined toward the outer side of the piston.

Figure 5:
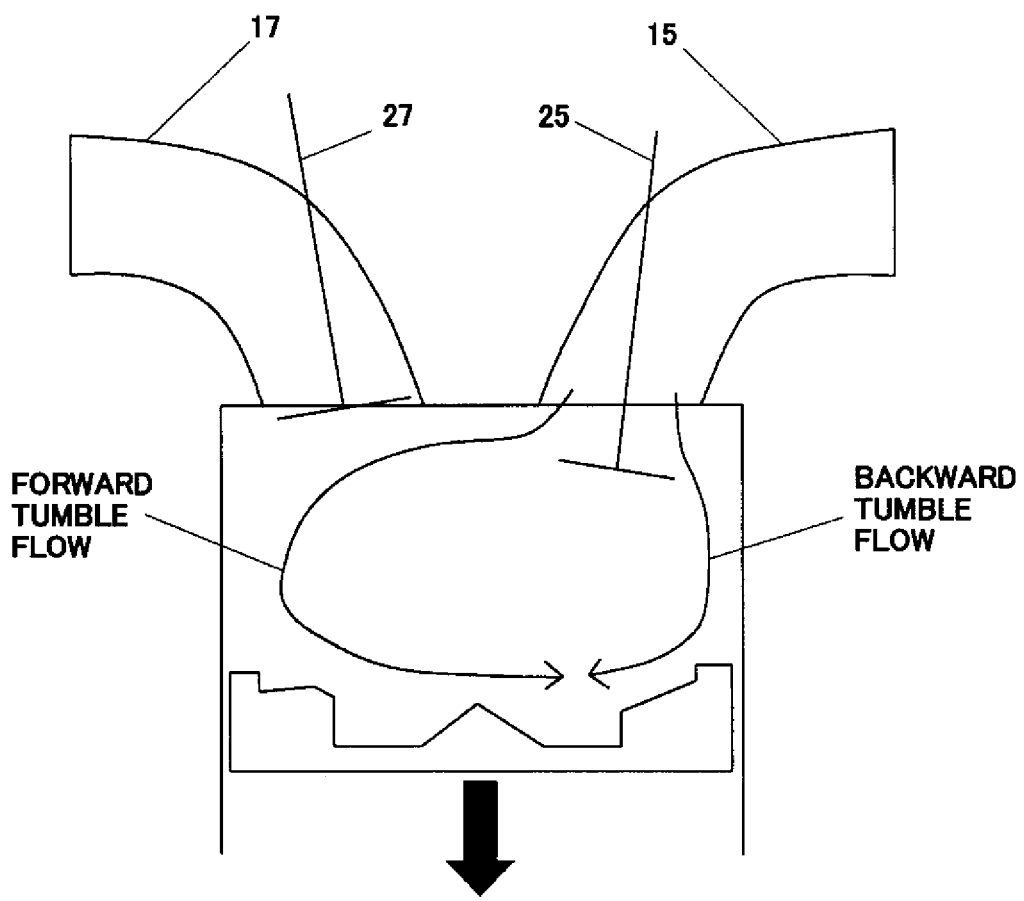
FIG. 5 illustrates a forward tumble flow and a backward tumble flow.

FIG. 5 is a view of a tumble flow generated in the cylinder. When a piston moves down in an open state of the intake valve, intake air is taken into the cylinder from the tangential port and the helical port. Although a swirl flow is generated in the cylinder due to the taken-in intake air, since the respective intake ports take in the intake air from an upper part of the cylinder, a tumble flow is also generated. This tumble flow can be classified into a forward tumble flow which is a tumble flow flowing along an upper surface in the combustion chamber from the intake port toward the exhaust port and a backward tumble flow which is a tumble flow flowing along the lower surface in the combustion chamber from the intake port toward the exhaust port. The present embodiment is configured such that the amount of the forward tumble flow is larger than the backward tumble flow.

Since the forward tumble flow and the backward tumble flow are vortex flows of the opposite directions, these tumble flows weaken each other. However, in the conventional technique, since there is a difference in the amounts of the forward tumble flow and the backward tumble flow, the tumble flows do not weaken each other sufficiently, and the process proceeds to a compression process in a state in which the forward tumble component remains strong. When the piston moves up in a state in which the tumble flow component remains strong, a fuel is injected in a state in which the swirl flow is inclined due to the effects of the forward tumble flow. In this case, fuel may not be distributed uniformly, and combustion may not occur satisfactorily. As a result, smoke may be generated.

In the present embodiment, the intake-side valve recess 31 is provided to be inclined toward the center of the A-A' cross-section. Due to this, the resistance that the backward tumble flow receives from the intake-side valve recess 31 can be decreased, and attenuation of the backward tumble flow can be suppressed. On the other hand, the exhaust-side valve recess 32 is provided to be inclined toward the outer side of the piston. Due to this, the resistance that the forward tumble flow receives from the exhaust-side valve recess 32 becomes larger than the resistance that the backward tumble flow receives from the intake-side valve recess 31. Therefore, the attenuation amount of the forward tumble flow can be made larger than the attenuation amount of the backward tumble flow.

Since the forward tumble flow of which the amount was originally large is attenuated, and the attenuation of the backward tumble flow of which the amount was small can be suppressed, the amounts of the forward tumble flow and the backward tumble flow can be made uniform or a difference between them can be decreased. As a result, since the forward tumble flow and the backward tumble flow cancel each other, and the effects of the tumble flow on the swirl flow can be reduced, the fuel injected into the combustion chamber 12 is stirred further and combustion occurs satisfactorily.

More preferably, the valve recess corresponding to the tangential port 22 among the intake-side valve recesses 31 is provided to be inclined toward the center of the A-A' cross-section. Since the amount of a tumble flow generated by the tangential port among the intake ports is larger than the amount of a tumble flow generated by the helical port, by forming the valve recess corresponding to the tangential port 22 so as to be inclined toward the center of the A-A' cross-section, attenuation of a backward tumble flow can be suppressed further. Therefore, the amounts of the forward tumble flow and the backward tumble flow can be made uniform or a difference between them can be decreased.

More preferably, at least one of the intake-side valve recesses 31 and at least one of the exhaust-side valve recesses 32 are provided in parallel to each other.

More preferably, the valve recess corresponding to the tangential port 22 and at least one of the exhaust-side valve recesses 32 are provided in parallel to each other. Since valve recesses having the same inclination can be manufactured easily since it is not necessary to adjust the individual inclinations of jigs or the like for cutting during manufacturing. Here, the number of exhaust-side valve recesses provided in parallel to the valve recess corresponding to the tangential port 22 may be one or plural.

Embodiment 2

In the present embodiment, the description of the same portions as those of Embodiment 1 will be omitted.

The present embodiment is configured such that the amount of a backward tumble flow is larger than the amount of a forward tumble flow.

A structure of a top surface of the piston will be described with reference to FIGS. 6 and 7.

Figure 6:
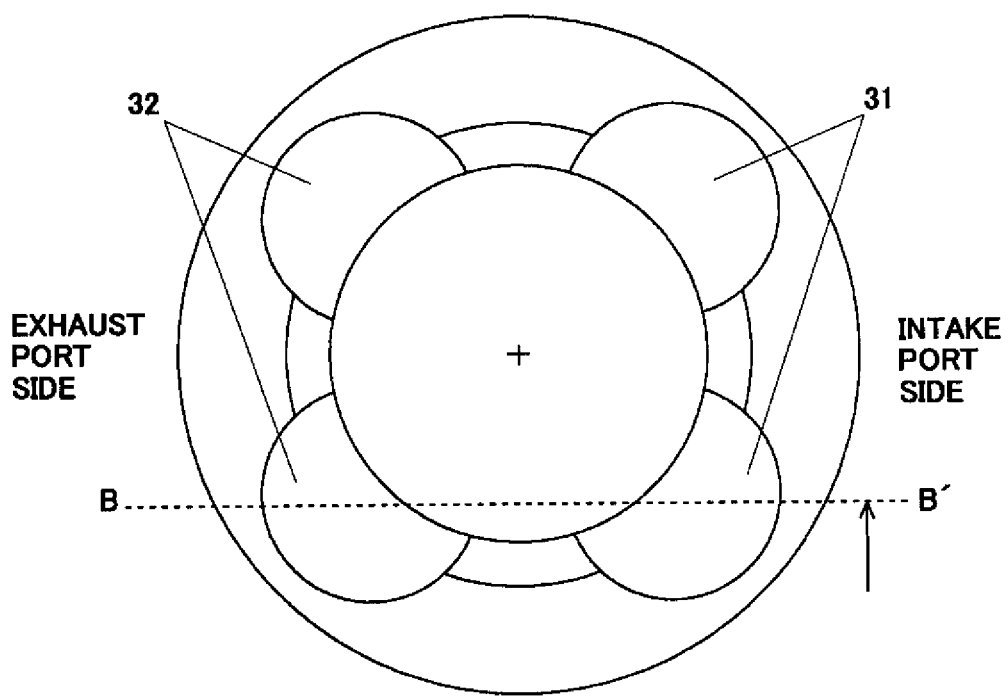
FIG. 6 is a top view of a piston according to Embodiment 2.

FIG. 6 is a view when the piston is seen from an upper side in an axial direction of the cylinder. Two intake-side valve recesses for avoiding interference with two intake valves and two exhaust-side valve recesses for avoiding interference with two exhaust valves are formed in the top surface of the piston.

Figure 7:
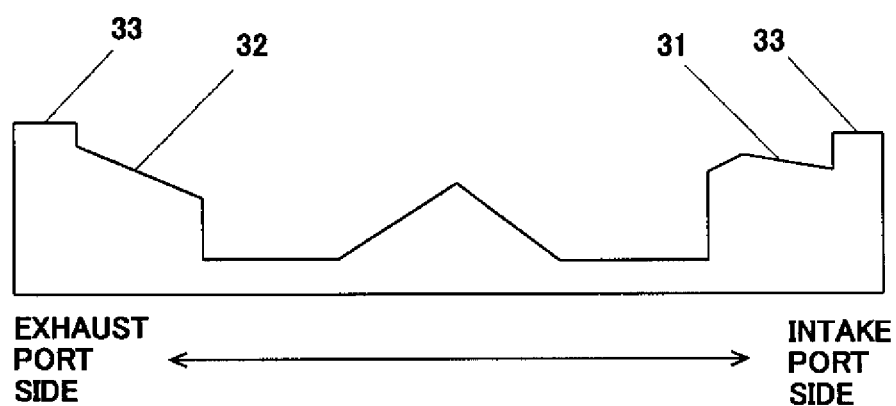
FIG. 7 is a cross-sectional view of the piston according to Embodiment 2.

FIG. 7 is a view when the piston is cut along a cross-section (B-B' cross-section in FIG. 6) parallel to a central axis of the piston passing through the intake-side valve recess and the exhaust-side valve recess adjacent thereto. A cavity which is a recess is formed in the top surface of the piston of the present embodiment, and a squish is provided on an outer periphery thereof.

In the present embodiment, the exhaust-side valve recess is provided to be-inclined toward the center of the B-B' cross-section, and the intake-side valve recess is provided to be inclined toward the outer side of the piston. Due to this, the resistance that the forward tumble flow receives from the exhaust-side valve recess can be decreased, and attenuation of the forward tumble flow can be suppressed. On the other hand, the intake-side valve recess is provided to be inclined toward the outer side of the piston. Due to this, the resistance that the backward tumble flow receives from the intake-side valve recess increases, and the backward tumble flow can be attenuated.

Since the backward tumble flow of which the amount was originally large is attenuated, and the attenuation of the forward tumble flow of which the amount was small can be suppressed, the amounts of the forward tumble flow and the backward tumble flow can be made uniform or a difference between them can be decreased. As a result, since the forward tumble flow and the backward tumble flow cancel each other, and the effects of the tumble flow on the swirl flow can be reduced, the fuel injected into the combustion chamber 12 is stirred further and combustion occurs satisfactorily.

More preferably, a valve recess corresponding to the exhaust port adjacent to the tangential port 22 among the exhaust-side valve recesses is provided to be inclined toward the center of the B-B' cross-section. Since the amount of a tumble flow generated by the tangential port among the intake ports is larger than the amount of a tumble flow generated by the helical port, by forming the valve recess corresponding to the exhaust port adjacent to the tangential port 22 so as to be inclined toward the center of the B-B' cross-section, attenuation of a forward tumble flow can be suppressed further. Therefore, the amounts of the forward tumble flow and the backward tumble flow can be made uniform or a difference between them can be decreased.

More preferably, the surface of the valve recess corresponding to the exhaust port adjacent to the tangential port 22 is provided to be parallel to the surface of the intake-side valve recess. Since valve recesses having the same inclination can be manufactured easily since it is not necessary to adjust the individual inclinations of jigs or the like for cutting during manufacturing. Here, the number of intake-side valve recesses provided in parallel may be one or plural.

A mechanism that generates a swirl in the combustion chamber 12 may be a swirl control valve provided in an intake port as well as the tangential port 22.

While a diesel engine has been described, the internal combustion engine is not limited thereto but may be a gasoline engine.

The present disclosure is not limited to the above-described embodiments but can be changed appropriately without departing from the spirit thereof.

What is claimed is:

1. An internal combustion engine comprising:
a mechanism configured to generate a swirl in a combustion chamber; and
a piston having an intake-side valve recess, which is a recessed surface formed to avoid interference with an intake valve and an exhaust-side valve recess, which is a recessed surface formed to avoid interference with an exhaust valve, wherein
when an amount of a backward tumble flow, which is a tumble flow flowing along a lower surface in the combustion chamber from the intake port toward the exhaust port is smaller than an amount of a forward tumble flow, which is a tumble flow flowing along an upper surface in the combustion chamber from the intake port toward the exhaust port, the intake-side valve recess is used as a first valve recess and the exhaust-side valve recess is used as a second valve recess,
when the amount of the backward tumble flow is larger than the amount of the forward tumble flow, the exhaust-side valve recess is used as a first valve recess and the intake-side valve recess is used as a second valve recess, and
when the piston is cut along a cross-section parallel to a central axis of the piston passing through the first valve recess and the second valve recess adjacent thereto, an inclination angle of the first valve recess is larger than an inclination angle of the second valve recess when comparing the inclination angle such that a height of the recess decreases gradually toward an inner side of the cross-section.

2. The internal combustion engine according to claim 1, further comprising two intake ports, which are a tangential port and a helical port, wherein
the tangential port and the helical port are shaped such that the amount of the backward tumble flow is smaller than the amount of the forward tumble flow, and
a valve recess corresponding to the tangential port is inclined further toward the center of the cross-section than a valve recess corresponding to the helical port.

3. The internal combustion engine according to claim 1, wherein at least one of the valve recesses close to the intake port is provided in parallel to at least one of the valve recesses close to the exhaust port.

* * * * *